United States Patent
Arimoto et al.

(12)

(10) Patent No.: US 6,344,926 B1
(45) Date of Patent: Feb. 5, 2002

(54) METHOD OF REPRODUCING THREE-DIMENSIONAL IMAGES AND THREE-DIMENSIONAL IMAGE-REPRODUCING DEVICE

(75) Inventors: Akira Arimoto, Fuchu; Tetsuya Ooshima, Kokubunji; Yoshiyuki Kaneko, Hachioji, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/381,398

(22) PCT Filed: Jul. 16, 1998

(86) PCT No.: PCT/JP98/03197

§ 371 Date: Sep. 20, 1999

§ 102(e) Date: Sep. 20, 1999

(87) PCT Pub. No.: WO99/05560

PCT Pub. Date: Feb. 4, 1999

(30) Foreign Application Priority Data

Jul. 22, 1997 (JP) .............................. 9-195641

(51) Int. Cl.⁷ ..................... G03B 21/56; G03B 21/60; G03B 27/22
(52) U.S. Cl. ..................... 359/443; 359/458; 359/462
(58) Field of Search .................. 359/443, 451, 359/449, 454, 459, 458, 462, 463, 1

(56) References Cited

U.S. PATENT DOCUMENTS 5,357,368 A * 10/1994 Dominquez-Montes ..... 359/454
5,930,037 A * 7/1999 Imai ............................ 359/463
6,008,484 A * 12/1999 Woodgate et al. .......... 359/458
6,283,598 B1 * 9/2001 Inami et al. ................. 359/451

FOREIGN PATENT DOCUMENTS

| JP | 51-13411 | * | 4/1976 |
| JP | 52-4949 | * | 2/1977 |
| JP | 4-500415 | * | 1/1992 |
| JP | 8-186848 | * | 7/1996 |
| JP | 10-221642 | * | 8/1998 |

* cited by examiner

Primary Examiner—Christopher E. Mahoney
(74) Attorney, Agent, or Firm—Antonelli, Terry, Stout & Kraus, LLP (57) ABSTRACT

High-grade three-dimensional images can be observed without a bright image of an exit end of an image projector superposed on the three-dimensional images. In a method of reproducing three-dimensional images by a three-dimensional image-reproducing device provided with an image projector and a directional reflective screen for collecting light from the image projector toward a specific position in a horizontal direction and for diffusing the light in a vertical direction, the directional reflective screen and the image projector are positioned with respect to the observer observing the three-dimensional images such that the observer is outside a region traversed by a portion of light rays which enter the directional reflective screen from the image projector, then are reflected by a surface of the directional reflective screen incapable of contributing to the reproduction of the three-dimensional images, and form a mirror image or a conjugate image of the image projector.

9 Claims, 7 Drawing Sheets

METHOD OF REPRODUCING THREE-DIMENSIONAL IMAGES AND THREE-DIMENSIONAL IMAGE-REPRODUCING DEVICE

TECHNICAL FIELD

The present invention relates to a method of reproducing three-dimensional images, a three-dimensional image-reproducing device and a directional reflective screen, and in particular to techniques useful for the method of reproducing three-dimensional images and the three-dimensional image-reproducing device enabling the observers to see three-dimensional images by binocular parallax without using special glasses.

TECHNICAL BACKGROUND

As a display device for providing three-dimensional images by using the binocular parallax without special glasses, there has been known a device comprising an image projecting means and a directional reflective or transmissive screen. Especially, a directional reflective screen employing a large number of compound mirrors to collect light in a horizontal direction toward the observer is disclosed in "Three-dimensional Image Technology" by T. Ohkoshi, published by Asakura Publishing Company, pp. 28 and 91–97.

DISCLOSURE OF THE INVENTION

The present inventors studied the above prior art three-dimensional image display device, and they found a problem with the prior art display device that a bright exit end of an image projector of the display device is imaged on the three-dimensional images formed by the three-dimensional image display device, this acts as stray light to the observer and degrades the quality of the three-dimensional images.

The present invention aims at solving the problem with the prior art display device, and it is an object of the present invention to provide techniques in the method of reproducing three-dimensional images or the three-dimensional image display device for enabling high-quality three-dimensional images to be observed without the bright exit end of the image projector of the display device being imaged on the three-dimensional images.

It is another object of the invention to provide techniques employed in a directional reflective screen of the three-dimensional image display device and capable of precisely indicating the observer's position where the observer can observe high-quality three-dimensional images without the bright exit end of the image projector of the display device being imaged on the three-dimensional images.

The above and other objects and novel features of the present invention will be obvious by the following description and the appended drawings.

The summary of representative inventions of the present inventions disclosed in this specification will be briefly explained below.

In a method of reproducing three-dimensional images by a three-dimensional image-reproducing device provided with image projector means and a directional reflective screen for collecting light from the image projector means toward a specific position in a horizontal direction and for diffusing the light from the image projecting means in a vertical direction, the method is characterized in that an observer observing three-dimensional images, said directional reflective screen and said image projecting means are positioned with respect to each other such that the observer is outside a region traversed by a portion of light rays which enter said directional reflective screen from said image projecting means, then are reflected by a surface of said directional reflective screen not contributing to reproduction of the three-dimensional images, and then form a mirror image or a conjugate image of said image projecting means, namely, the observer is in a region where the mirror image or the conjugate image of said image projecting means is not observed by the observer.

Further, in a three-dimensional image-reproducing device provided with image projecting means and a directional reflective screen for collecting light from said image projecting means toward a specific position in a horizontal direction and diffusing the light from said image projecting means in a vertical direction, the three-dimensional image-reproducing device is characterized in that said directional reflective screen and said image projecting means are positioned such that said observer's position is outside a region traversed by a portion of light rays which enter said directional reflective screen from the image projecting means, then are reflected by a surface of said directional reflective screen not contributing to reproduction of the three-dimensional images, and then form a mirror image or a conjugate image of said image projecting means.

Further, in a directional reflective screen for use in a three-dimensional image-reproducing device, for collecting light from an image projecting means of said device toward a specific position in a horizontal direction and for diffusing the light from the image projecting means in a vertical direction, the directional reflective screen is characterized in that said directional reflective screen is provided with an indicator for indicating that an observer for observing three-dimensional images is outside a region traversed by a portion of light rays which enter said directional reflective screen from the image projecting means, then are reflected by a surface of said directional reflective screen not contributing to reproduction of the three-dimensional images, and then form a mirror image or a conjugate image of the image projecting means, said indicator includes a box having a slit and a light-producing element positioned within said box, a position of said light-producing element being adjustable depending upon a length of said slit and a distance between said image projecting means and said directional reflective screen, and said indicator is configured so as to indicate that the observer is outside said region traversed by the portion of light rays which form a mirror image or a conjugate image of the image projecting means when light from said light-producing element is observed through said slit.

BEST MODE FOR CARRYING OUT THE INVENTION

The embodiments of the present invention will be explained in detail by reference to the drawings.

Like reference numerals designate components performing similar functions throughout the figures for explaining the embodiments, and repetition of their explanation is omitted.

Embodiment 1

Figures 2, 2A, 2B:
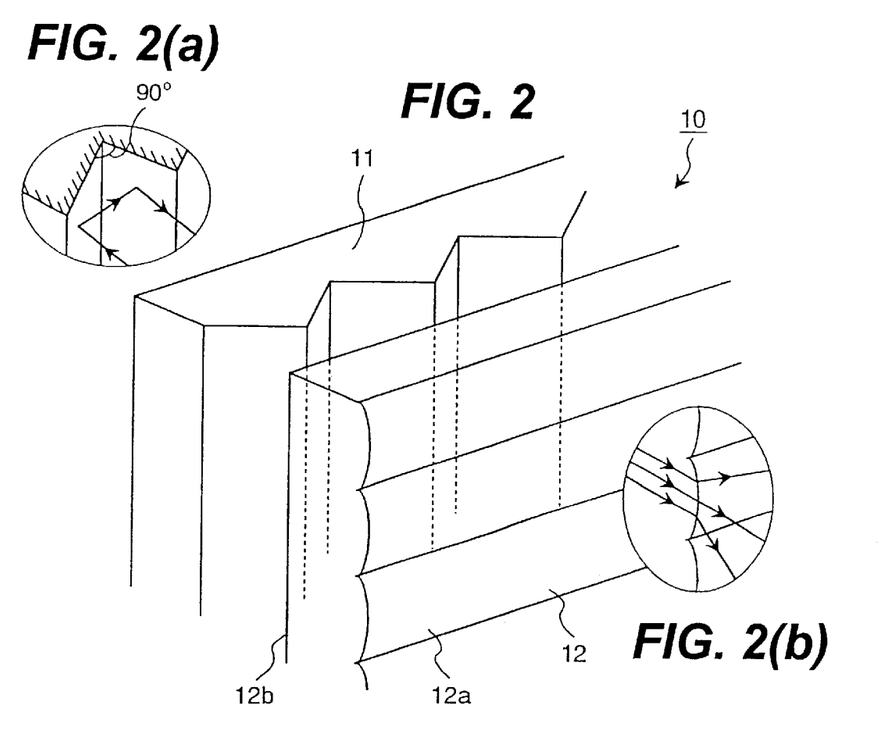
FIG. 2 is a perspective view of an essential portion of an example of a directional reflective screen using compound mirrors as means for collecting light in a horizontal direction.

FIG. 2 is a fragmentary perspective view of an essential portion of an example of a directional reflective screen employing a large number of compound mirrors as means for collecting light in a horizontal direction. In FIG. 2, the directional reflective screen 10 is comprised of a large number of compound mirrors 11 each formed of a pair of mirrors perpendicular to each other and a lenticular lens 12.

Figure 3A:
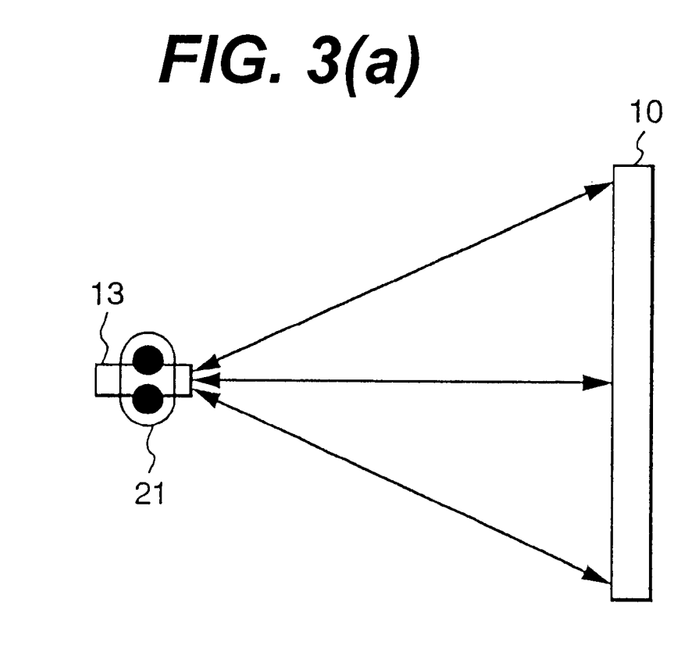
FIGS. 3(a) and 3(b) are illustrations for showing light-collecting properties of the directional reflective screen shown in FIG. 2.
Figure 3B:
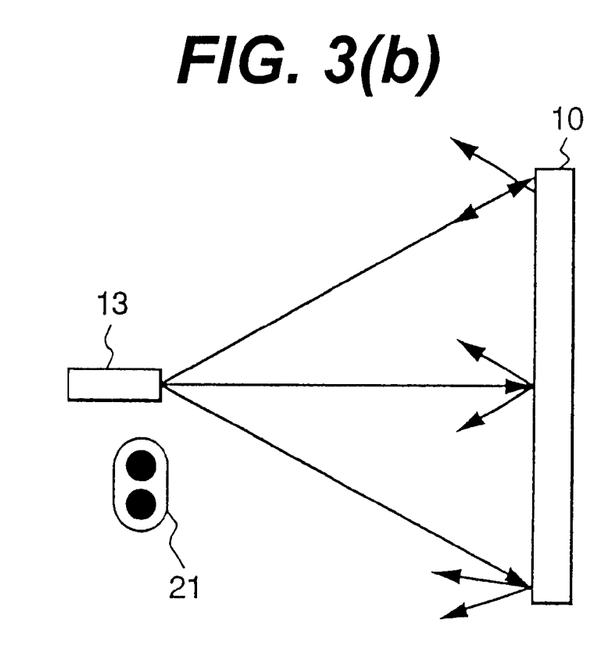

FIGS. 3(a) and 3(b) illustrate light-collecting properties of the directional reflective screen 10 shown in FIG. 2. Throughout the figures in the accompanying drawings, the projector 13 denotes a pair of projectors spaced a distance between the two eyes from each other.

As shown in FIG. 2, light entering the compound mirrors 11 is reflected twice, and returns backward. Therefore, as shown in FIG. 3(a), light (image-forming rays) emitted from the projector 13 and entering the directional reflective screen 10 is reflected by the compound mirrors 11, and collected at a position of the projector 13 in a horizontal direction.

As shown in FIG. 2 and 3(b), the lenticular lens 12 diffuses light (image-forming rays) emitted from the projector 13 and entering the directional reflective screen 10 in a vertical direction.

In this way, light (image-forming rays) emitted from the projector 13 and entering the directional reflective screen 10 is collected, that is, forms an image at a position of the projector 13 in a vertically extending region.

Consequently, as shown in FIGS. 3(a) and 3(b), when the two projectors 13 are disposed immediately over or under the right and left eyes of the observer 21, respectively, and a pair of video images for forming three-dimensional images based upon the principle of the binocular parallax are projected from the projector onto the directional reflective screen 10, the observer can see the three-dimensional images.

Figure 4:
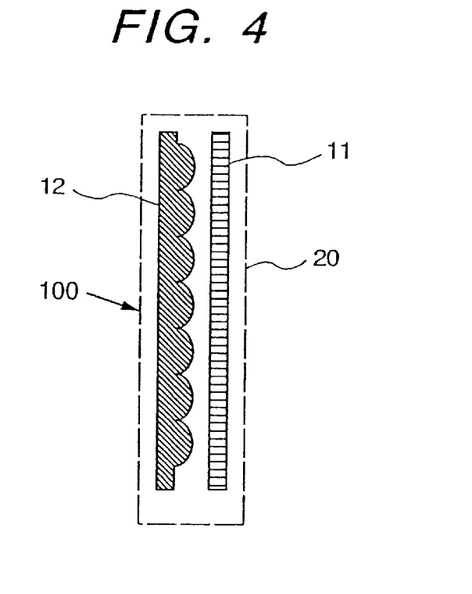
FIG. 4 is a vertical cross-sectional view of an integrated screen having the directional reflective screen of FIG. 2 assembled as a unit.

FIG. 4 is a vertical cross-section of an integrated screen 20 in which the compound mirrors 11 and the lenticular lens 12 constituting the directional reflective screen 10 in FIG. 2 are integrally assembled. Reference numeral denotes a direction in which light enters.

In the directional reflective screen 10 shown in FIG. 2, the lenticular lens 12 comprises a cylindrical surface 12a providing lens action and a flat surface 12b opposite to the cylindrical surface. It is generally preferable that, as shown in FIG. 4, the flat surface 12b of the lenticular lens 12 is arranged to face toward the observer so that the cylindrical surface (lens) 12a is not damaged.

In the integrated screen 20 shown in FIG. 4, however, the flat surface 12b of the lenticular lens 12 forms a mirror image of the exit end of the projector 13.

Figure 5:
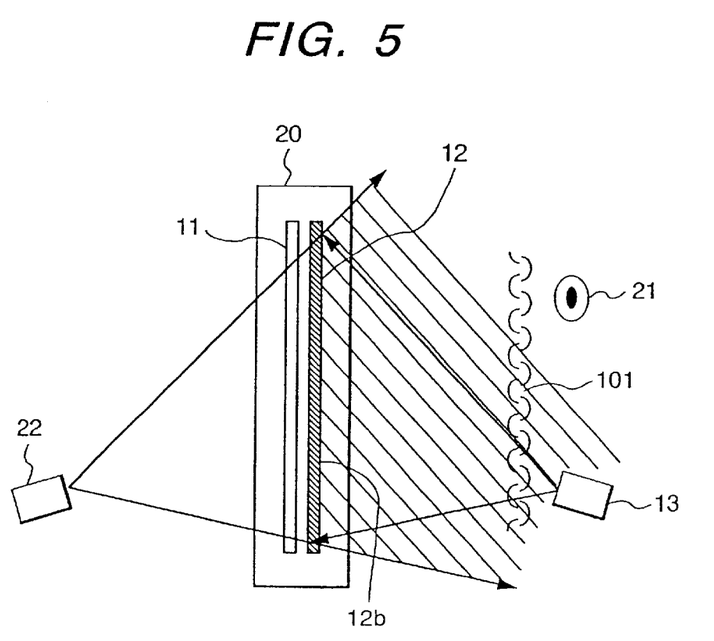
FIG. 5 is a -vertical cross-sectional view of an arrangement of a projector and an integrated screen where a mirror image of the projector is formed by the integrated screen.

Consider the optical arrangement of the projector 13 and the integrated screen 20 in vertical cross-section as shown in FIG. 5, for example. This integrated screen 20 is a combination of the compound mirrors 11 each formed of a pair of mirrors perpendicular to each other and the lenticular lens 12, as explained above. The mirror image 22 of the projector 13 formed by the flat surface 12b of the lenticular lens 12 is positioned opposite to the lenticular lens 12.

If the eyes of the observer 21 are positioned in the hatched region shown in FIG. 5, the mirror image 22 enters the view of the observer 21, this bright mirror image 22 becomes stray light to the observer 21 and consequently degrades the quality of the three-dimensional images. Reference numeral 101 in FIG. 5 indicates a viewing region capable of providing three-dimensional images.

Figure 1:
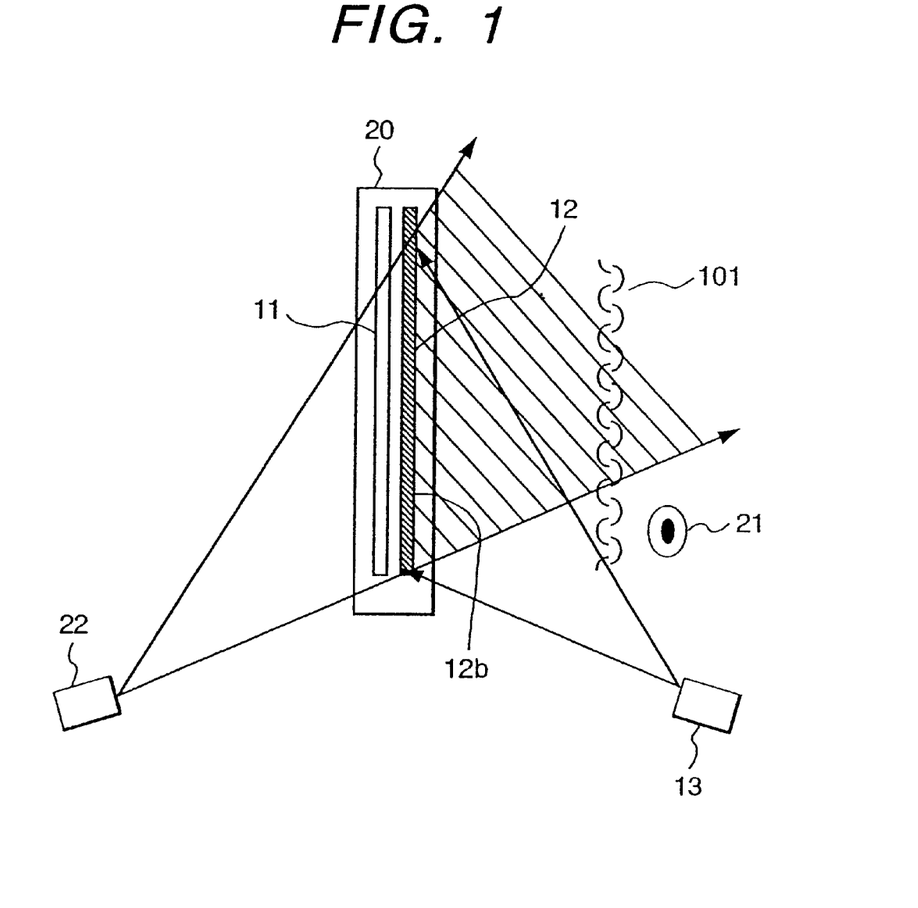
FIG. 1 is an illustration of a basic construction of an embodiment of a three-dimensional image according to the present invention, showing an optical arrangement in vertical cross-section of a projector and an integrated screen.

FIG. 1 illustrates a basic construction of an embodiment of a three-dimensional image-forming device according to the present invention, and shows an arrangement in vertical cross-section of the projector 13 and the integrated screen 20.

As shown in FIG. 1, in this embodiment, the relative positions of the observer 21, the integrated screen 20 and the projector 13 are set such that the mirror image 22 of the projector 13 formed by the flat surface 12b of the lenticular lens 12 is not in the view of the observer 21.

The hatched region in FIG. 1 indicates a region where the mirror image 22 of the projector 13 formed by the flat surface 12b of the lenticular lens 12 enters the view of the observer 21.

In this embodiment, the viewing region 101 in a vertical direction capable of providing three-dimensional images is wide due to the inherent diffusing action of the lenticular lens 12, and the observer 21 can watch satisfactory three-dimensional images even when the eyes of the observer 21 are outside the hatched region indicated in FIG. 1.

In this way, the mirror image 22 of the projector 13 formed by the flat surface 12b of the lenticular lens 12 is not observable if the eyes of the observer 21 are positioned as shown in FIG. 1. An example of simple methods of determining the region where the mirror image 22 of the projector 13 is not observable equips the integrated screen 20 with such an indicator that the observer can see a signal of the indicator when the eyes 21 of the observer is positioned as shown in FIG. 1.

Figure 6:
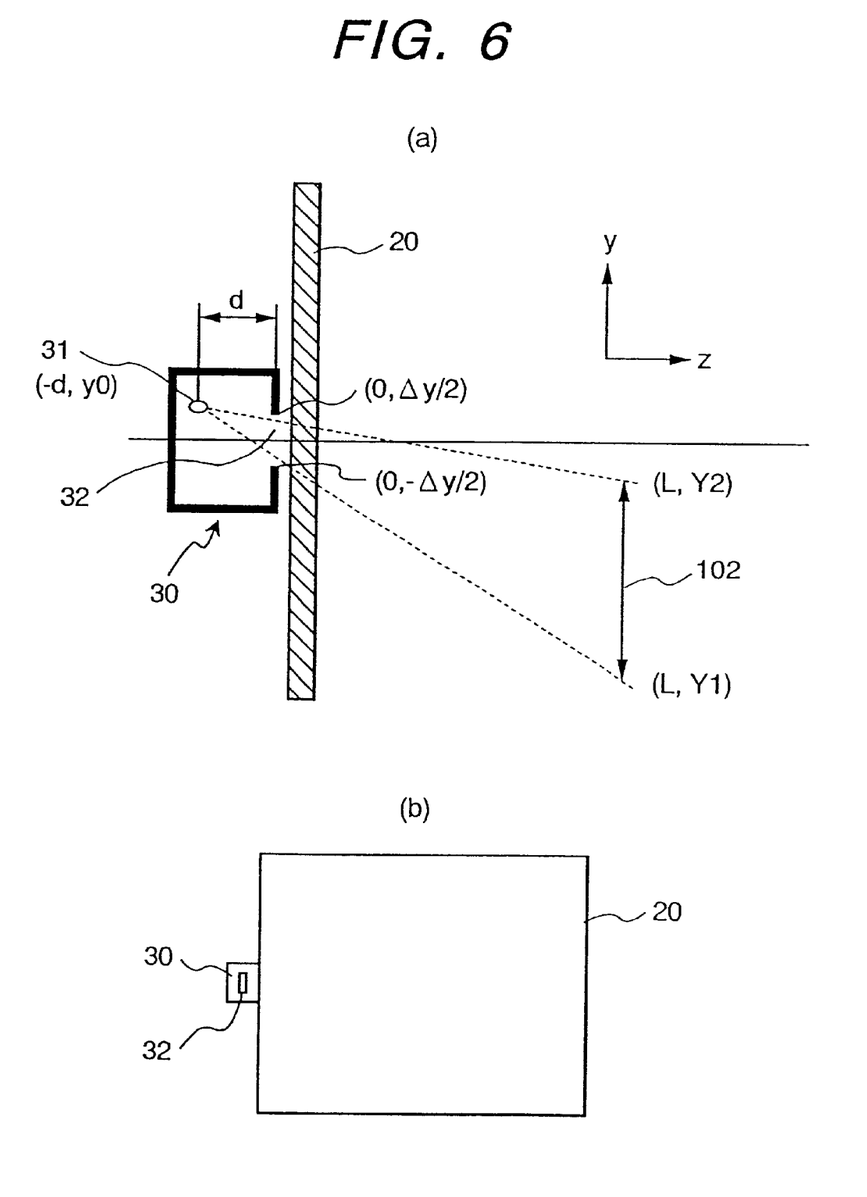
FIGS. 6(a) and 6(b) are illustrations of a basic construction of an embodiment of an indicator according to the present invention, showing the geometric positional relationship between an indicator and a projector.

FIGS. 6(a) and 6(b) are illustrations for explaining a basic construction of an indicator in this embodiment and a geometric positional relationship between the indicator and the projector (not shown), FIG. 6(a) is a cross-sectional side view of the screen 20 and the indicator 30, and FIG. 6(b) is a front view thereof.

As shown in FIG. 6(b), the indicator 30 of this embodiment is disposed in the vicinity of the center of side of the integrated screen 20. The indicator 30 is provided with a light-producing element (alight emitting diode, for example) 31 and a slit 32, as shown in FIG. 6(a). The indicator 30 is configured such that the observer 21 can see the light-producing element 31 through the slit 32 only when the observer 21 see the integrated screen 20 from the region where the mirror image 22 of the projector 13 formed by the flat surface 12b of the lenticular lens 12 is not in the view of the observer 21.

In the coordinate system shown in FIG. 6(a), the three-dimensional images are formed at z=L, by the projector 13 (not shown, see FIG. 5). In this case, L is usually a distance between the projector 13 and the integrated screen 20.

Assume the Y coordinates of the extreme ends of the region where the mirror image 22 (see FIG. 5) of the projector 13 does not enter the three-dimensional images formed by the projector 13 are Y1 and Y2, respectively, and the width of the slit 32 of the indicator 30 and a distance between the slit 32 and the light-producing element 31 are $\Delta y$ and d, respectively. In this embodiment, the positional relationship satisfies the equations (1) and (2) below.

$$d = L(\Delta y/(\Delta Y - \Delta y)) \quad (1)$$

$$y0 = -\Delta y(Y1 + Y2)/\{2(\Delta Y - \Delta y)\} \quad (2)$$

where $\Delta Y = Y2 - Y1$, and y0=the y coordinate of the light-producing element 31.

The indicator 30 is used as follows:

(1) First the projector 13 and the integrated screen 20 are arranged, and then determine the Y coordinates Y1 and Y2 of the extreme ends of the region where the mirror image 22 of the projector 13 does not enter the three-dimensional images formed by the projector 13.

(2) The distance d between the slit 32 of the indicator 30 and the light-producing element 31 and the y coordinate y0 of the light-producing element 31 are calculated from these Y coordinates Y1, Y2 by using the above equations (1) and (2), and then the light-producing element 31 is positioned by using d and y0.

(3) With this structure, the mirror image 22 of the projector 13 formed by the flat surface 12b of the lenticular lens 12 does not enter the view of the observer 21 if the observer 21 is in a region where the observer 21 see the light-producing element 31.

By using this indicator 30, each of a plurality of observers does not need search for a position where the mirror image 22 of the projector 13 formed by the flat surface 12b of the lenticular lens 12 is not observable, even when the observers take turns watching the screen.

Embodiment 2

Figure 7:
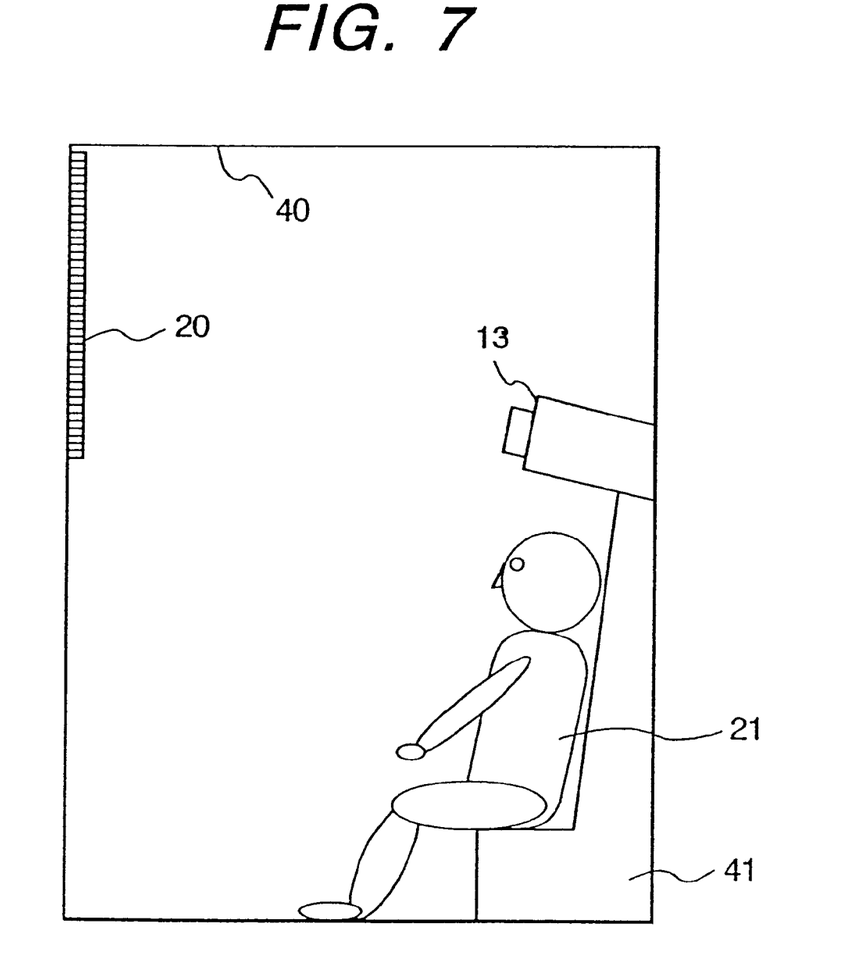
FIG. 7 is a block diagram for showing a basic structure of another embodiment of a three-dimensional image-reproducing device according to the present invention.

FIG. 7 is a schematic structure of another embodiment of the three-dimensional image-reproducing device according to the present invention.

In this embodiment, initially the projector 13 and the integrated screen 20 are fixed with relation to each other inside a box 40, and then the seat 41 for the observer 21 is fixed inside the box 40 such that the eyes of the observer 21 are positioned not to see the mirror image 22 of the projector 13 formed by the flat surface 12b of the lenticular lens 12.

The seat 41 is provided with a height adjusting mechanism capable of adjusting the height of the seat 41 finely so that the better position for observation is obtained.

By using the indicator 30 of the previous embodiment in addition to the height adjusting mechanism, the optimum position for observation can be determined more easily.

Embodiment 3

For improving brightness and uniformity of the brightness, curving the integrated screen 20, namely, the lenticular lens 12 and the compound mirrors 11 into a cylindrical form in vertical cross-section is proposed by Japanese Patent Application No. Hei 8-007135.

In this case, the conjugate image (a real image or a virtual image) of the exit end of the projector 13 is formed by the flat surface 12b of the lenticular lens 12.

Figure 8:
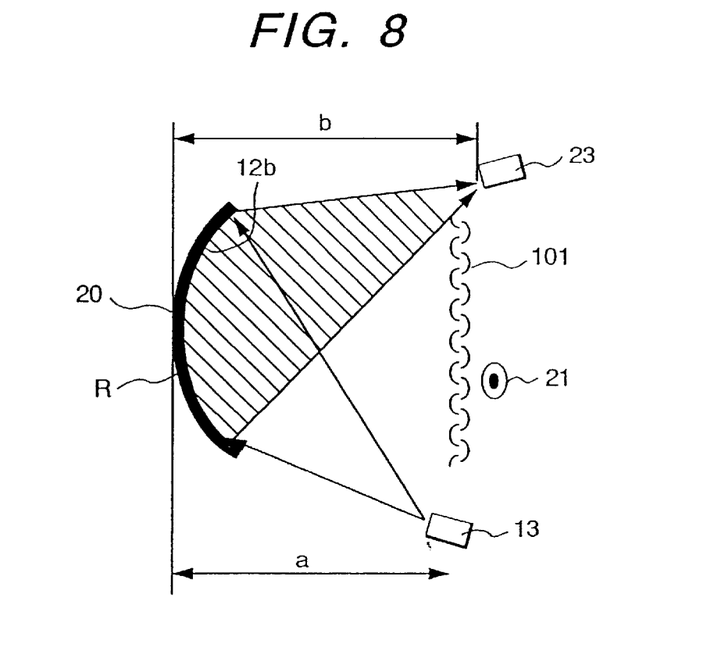
FIG. 8 is an illustration of a basic construction of still another embodiment of a three-dimensional image-reproducing device according to the present invention, showing an arrangement in vertical cross-section of an integrated screen and a projector where a real conjugate image is formed when the integrated screen is curved with a radius R in vertical cross-section.
Figure 9:
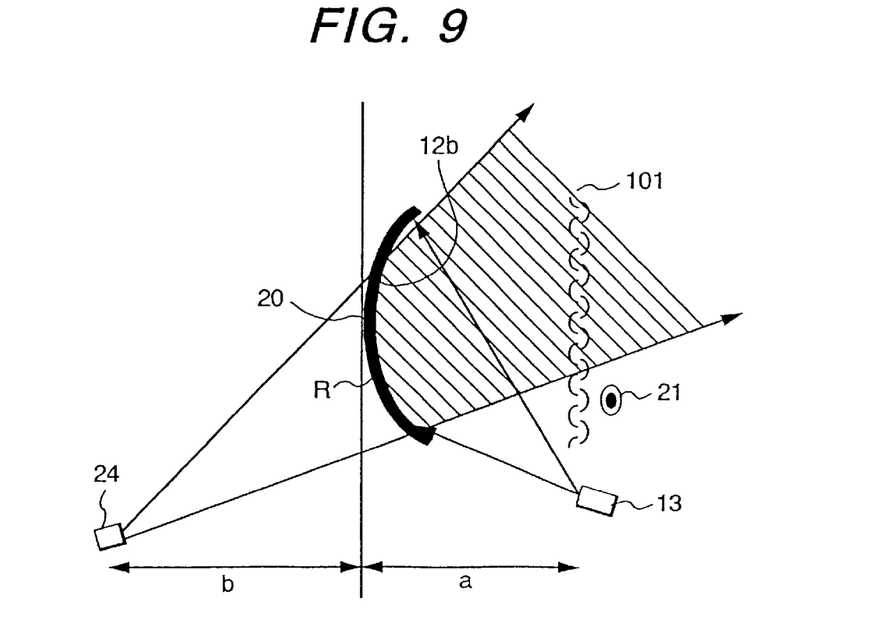
FIG. 9 is an illustration of a basic construction of still another embodiment of a three-dimensional image-reproducing device according to the present invention, showing an arrangement in vertical cross-section of an integrated screen and a projector where a virtual conjugate image is formed when the integrated screen is curved with a radius R in vertical cross-section.

FIGS. 8 and 9 illustrate the basic structure of another embodiment of the three-dimensional image-reproducing device according to the present invention.

FIG. 8 illustrates an arrangement in vertical cross-section of the integrated screen 20 and the projector 13 where the real conjugate image 2 3 is formed when the integrated screen 20 is curved with a radius R in vertical cross-section, and FIG. 9 illustrates another arrangement in vertical cross-section of the integrated screen 20 and the projector 13 where the virtual conjugate image 24 is formed when the integrated screen 20 is curved with the radius R in vertical cross-section. Reference numeral 101 denotes the viewing region capable of providing three-dimensional images in FIGS. 8 and 9.

If the eyes of the observer 21 are in the hatched region indicated in FIGS. 8 and 9, the conjugate images 23 and 24 of the projector 13 formed by the integrated screen 20 enter the view of the observer 21, respectively. These bright conjugate images 23 and 24 act as stray light to the observer 2 and degrade the quality of the three-dimensional images.

In FIGS. 8 and 9, assume that a distance between the projector 13 and the integrated screen 20 is a. The conjugate images 23 and 24 of the projector 13 formed by the integrated screen 20 are formed at a distance b obtained by the well-known image formation equation (3) below for reflective mirrors.

$$(1/a) + (1/b) = 2/R \quad (3)$$

On the other hand, the eyes of the observer 21 need to be positioned at a distance from the screen equal to the distance between the screen and the exit end of the projector, due to directivity of the compound mirrors 11 each formed of a pair of mirrors perpendicular to each other, and therefore the distance of the eyes of the observer 21 from the screen is substantially equal to a.

The rays forming the unwanted conjugate images 23, 24 of the projector 13 by reflection caused by the flat surface 12b of the integrated screen 20, after being reflected by the integrated screen 20 traverse the hatched region in FIGS. 8 and 9, and therefore the unwanted conjugate images 23, 24 are not observable if the eyes of the observer 21 are positioned outside the hatched region in FIGS. 8 and 9.

In this embodiment also, needless to say, the viewing region 101 capable of providing three-dimensional images are present outside the hatched region indicated in FIGS. 8 and 9 as explained in each of the previous embodiments, and the three-dimensional images formed by the projector 13 are observable.

When FIGS. 8 and 9 are compared with each other, in the case of formation of the real conjugate image 23 illustrated in FIG. 8, the space which the rays traverse for forming the conjugate image 23 of the projector 13 with the integrated screen 20 is smaller than in FIG. 9, and as a consequence the region for providing observation without influences of the stray light is increased.

To reduce the region causing the stray light, it is effective that the distance b of the conjugate image point is made equal to the distance a of the observer 21, but that the conjugate image and the observer are positioned at heights differing from each other. Therefore the region where the stray light is observable is minimized when a=b=R.

The previous embodiments are explained by using two projectors, but the present invention is not limited to cases of two projectors. The arrangement of the projector and the integrated screen, and the positioning of the eyes of the observer 21 explained in the previous embodiments are applicable to cases employing more than two projectors.

In the previous embodiments, the flat surface 12b of the lenticular lens 12 is on the projector 13 side thereof, but, even when the flat surface 12b of the lenticular lens 12 is on the side of the lenticular lens 12 facing away from the projector 13, the influences of reflection by the flat surface 12b of the lenticular lens 12 exists more or less, the arrangement of the projector 13 and the integrated screen 20 as explained in each of the previous embodiments can improve the quality of the three-dimensional images formed by the projector 13.

The inventions made by the present inventors have been explained concretely based upon the previous embodiments, but the present invention is not limited to the previous embodiments and it goes without saying that various changes and modifications may be made without departing from the true spirit and scope of the invention.

INDUSTRIAL APPLICABILITY

According to the present invention, image projecting means and a directional reflective screen are positioned with respect to the observer's position such that the observer can observe three-dimensional images without seeing the mirror image or conjugate image of the image projecting means, and consequently the observer can observe high-grade three-dimensional images without bright stray light superposed on the three-dimensional images.

What is claimed is:

1. A method of reproducing three-dimensional images by a three-dimensional image-reproducing device provided with image projecting means and a directional reflective screen for collecting light from said image projecting means toward a specific position in a horizontal direction and diffusing the light from said image projecting means in a vertical direction, said method characterized in that an observer observing three-dimensional images, said directional reflective screen and said image projecting means are positioned with respect to each other such that the observer is outside a region traversed by a portion of light rays which enter said directional reflective screen from said image projecting means, then are reflected by a surface of said directional reflective screen not contributing to reproduction of the three-dimensional images, and then form a mirror image or a conjugate image of said image projecting means.

2. A method of reproducing three-dimensional images according to claim 1, wherein a surface of said directional reflective screen facing toward said image projecting means is curved in vertical cross-section with a radius R, and the following equation is satisfied, $$a=b=R,$$

where a is a distance between said directional reflective screen and said image projecting means, and
b is a distance between said directional reflective screen and a position of the conjugate image.

3. A method of reproducing three-dimensional images according to one of claims 1 and 2, wherein said directional reflective screen is an integrated screen having a plurality of compound mirrors for collecting light from said image projecting means toward a specific position in a horizontal direction and a lenticular lens for diffusing the light from said image projecting means in a vertical direction assembled as a unit.

4. A three-dimensional image-reproducing device provided with image projecting means and a directional reflective screen for collecting light from said image projecting means toward a specific position in a horizontal direction and diffusing the light from said image projecting means in a vertical direction, said three-dimensional image-reproducing device characterized in that said directional reflective screen and said image projecting means are positioned with respect to an observer's position observing three-dimensional images such that said observer's position is outside a region traversed by a portion of light rays which enter said directional reflective screen from said image projecting means, then are reflected by a surface of said directional reflective screen not contributing to reproduction of the three-dimensional images, and then form a mirror image or a conjugate image of said image projecting means.

5. A three-dimensional image-reproducing device according to claim 4, wherein said observer's position is provided with a seat for the observer.

6. A three-dimensional image-reproducing device according to claim 4 or 5, wherein a surface of said directional reflective screen facing toward said image projecting means is curved in vertical cross-section with a radius R, and the following equation is satisfied, $$a=b=R,$$

where a is a distance between said directional reflective screen and said image projecting means, and
b is a distance between said directional reflective screen and a position of the conjugate image.

7. A three-dimensional image-reproducing device according to claim 4 or 5, wherein said directional reflective screen is an integrated screen having a plurality of compound mirrors for collecting light from said image projecting means toward a specific position in a horizontal direction and a lenticular lens for diffusing the light from said image projecting means in a vertical direction assembled as a unit.

8. A three-dimensional image-reproducing device according to claim 6, wherein said directional reflective screen is an integrated screen having a plurality of compound mirrors for collecting light from said image projecting means toward a specific position in a horizontal direction and a lenticular lens for diffusing the light from said image projecting means in a vertical direction assembled as a unit.

9. A directional reflective screen for use in a three-dimensional image-reproducing device, for collecting light from an image projecting means of said device toward a specific position in a horizontal direction and for diffusing the light from the image projecting means in a vertical direction, said directional reflective screen characterized in that said directional reflective screen is provided with an indicator for indicating that an observer for observing three-dimensional images is outside a region traversed by a portion of light rays which enter said directional reflective screen from the image projecting means, then are reflected by a surface of said directional reflective screen not contributing to reproduction of the three-dimensional images, and then form a mirror image or a conjugate image of the image projecting means, said indicator includes a box having a slit and a light-producing element positioned within said box, a position of said light-producing element being adjustable depending upon a length of said slit and a distance between said image projecting means and said directional reflective screen, and said indicator is configured so as to indicate that the observer is outside said region traversed by the portion of light rays which form a mirror image or a conjugate image of the image projecting means when light from said light-producing element is observed through said slit at an observer's position.

\* \* \* \* \*